(12) United States Patent
Cho et al.

(10) Patent No.: US 12,040,493 B2
(45) Date of Patent: Jul. 16, 2024

(54) LITHIUM METAL ANODES AND METHOD OF MAKING SAME

(71) Applicant: Soelect Inc., Greensboro, NC (US)

(72) Inventors: Sungjin Cho, Summerfield, NC (US); Jongsoo Cho, Greensboro, NC (US)

(73) Assignee: SOELECT INC., Greensboro, NC (US)

( * ) Notice: Subject to any disclaimer, the term of this patent is extended or adjusted under 35 U.S.C. 154(b) by 217 days.

(21) Appl. No.: 17/081,152

(22) Filed: Oct. 27, 2020

(65) Prior Publication Data

US 2021/0126260 A1    Apr. 29, 2021

Related U.S. Application Data

(60) Provisional application No. 63/070,656, filed on Aug. 26, 2020, provisional application No. 63/048,921, (Continued)

(51) Int. Cl.
| | |
|---|---|
| H01M 4/62 | (2006.01) |
| H01M 4/02 | (2006.01) |
| H01M 4/04 | (2006.01) |
| H01M 4/134 | (2010.01) |
| H01M 4/1395 | (2010.01) |
| H01M 4/36 | (2006.01) |
| H01M 4/38 | (2006.01) |

(Continued)

(52) U.S. Cl.
CPC ......... *H01M 4/628* (2013.01); *H01M 4/0404* (2013.01); *H01M 4/043* (2013.01); *H01M 4/134* (2013.01); *H01M 4/1395* (2013.01); *H01M 4/366* (2013.01); *H01M 4/382* (2013.01); *H01M 4/661* (2013.01); *H01M 10/052* (2013.01); *H01M 2004/021* (2013.01); *H01M 2004/027* (2013.01)

(58) Field of Classification Search
CPC .... H01M 4/628; H01M 4/0404; H01M 4/134; H01M 4/1395; H01M 4/366; H01M 4/382; H01M 10/052; H01M 2004/027; H01M 4/043–0435
See application file for complete search history.

(56) References Cited

U.S. PATENT DOCUMENTS

| 5,366,826 A | 11/1994 | Saidi |
| 5,503,946 A | 4/1996 | Fauteux et al. |

(Continued)

FOREIGN PATENT DOCUMENTS

| CN | 109037626 A | * 12/2018 | ............ H01M 10/05 |
| CN | 106654232 B | * 4/2019 | .......... H01M 10/052 |

(Continued)

OTHER PUBLICATIONS

Espacenet machine translation of KR20130067920A (Year: 2013).*

(Continued)

*Primary Examiner* — Jonathan G Leong
*Assistant Examiner* — Katharine A Caughron
(74) *Attorney, Agent, or Firm* — Sage Patent Group

(57) ABSTRACT

Lithium metal anodes have a current collector foil laminated to a layer of lithium metal (or alloy) which has particulate materials at least partially embedded therein to reduce dendrite formation and thus improve the performance and cycle life of the anode. The lithium anodes are conveniently produced using a roller press process.

8 Claims, 14 Drawing Sheets

Related U.S. Application Data filed on Jul. 7, 2020, provisional application No. 62/927,082, filed on Oct. 28, 2019.

(51) Int. Cl.
  *H01M 4/66* (2006.01)
  *H01M 10/052* (2010.01)

(56) References Cited

U.S. PATENT DOCUMENTS

| | | | |
|---|---|---|---|
| 2013/0130108 | A1 | 5/2013 | Alarco et al. |
| 2014/0272594 | A1 | 9/2014 | Safont Sempere et al. |
| 2015/0072234 | A1 | 3/2015 | Mitchell et al. |
| 2017/0133662 | A1 | 5/2017 | Cui et al. |
| 2017/0338475 | A1* | 11/2017 | Laramie ............ H01M 10/0525 |
| 2018/0166743 | A1* | 6/2018 | Lee ........................ H01M 4/624 |
| 2018/0241042 | A1* | 8/2018 | Cho ........................ H01M 12/08 |
| 2019/0280304 | A1* | 9/2019 | Cho ........................ H01M 4/663 |
| 2022/0255063 | A1* | 8/2022 | Yersak .................... H01M 4/38 |
| 2022/0416221 | A1* | 12/2022 | Jung ..................... H01M 4/0435 |

FOREIGN PATENT DOCUMENTS

| | | | |
|---|---|---|---|
| DE | 102017218158 | | 4/2019 |
| KR | 2013067920 A | * | 6/2013 |

OTHER PUBLICATIONS

Indian Examination Report, Indian Application No. 202227010300, mailed Jan. 18, 2024, 6 pages. (Year: 2024).*
International Search Report from co-pending PCT/US2020/057468, date mailed Jan. 27, 2021, all references cited thereon are identified above in the requisite section.
Canadian Office Action, Canadian Application No. 3154310, mailed Oct. 3, 2023, 9 pages.

\* cited by examiner

LITHIUM METAL ANODES AND METHOD OF MAKING SAME

CROSS-REFERENCE TO RELATED APPLICATIONS

This application claims the benefit of Provisional U.S. Patent Application No. 63/048,921, filed 7 Jul. 2020 and entitled "Multifunctional Lithium Metal Anode and Its Preparation"; Provisional U.S. Patent Application No. 63/070,656, filed 26 Aug. 2020 and entitled "Preparation Method of Lithium Metal Anode"; and Provisional U.S. Patent Application No. 62/927,082, filed 28 Oct. 2019 and entitled "Method of Preparing Lithium Composite Anode" and incorporates each of the aforementioned applications by reference in their respective entireties herein.

FIELD OF THE INVENTION

The invention herein pertains to metal anodes in energy storage devices generally, and more particularly pertains to lithium metal anodes suited for use in electrochemical storage devices such as batteries and other applications that are resistant to the formation of dendrites.

DESCRIPTION OF THE PRIOR ART AND OBJECTIVES OF THE INVENTION

Lithium metal has a high capacity and easily engineered. Lithium metal is one of the most promising high energy and power anode material for next generation electronic devices as well as electric vehicles due to its nearly ten times higher specific capacity of 3860 mAh/g than graphite and the lowest redox electrochemical potential of −3.04 V (vs. standard hydrogen electrode). These properties make lithium metal a promising and attractive material for use as anodes in next generation batteries. However, a common problem with lithium used in connection with conventional battery technology is that it is prone to form dendrites. Dendrites are small whiskers of lithium metal that form on the surface of the electrode. The formation of the dendrites can lead to poor battery performance, low Coulombic efficiency, poor cycle life, electrochemical and thermal instability and short circuits, which in turn can lead to battery overheating and even combustion (i.e. fire).

Without the intent to be tied to any particular theory, these disadvantages of dendrite formation are believed to be attributed to the highly reactive nature of solid lithium metal and the unfavorable interaction between electrode and electrolyte. In particular, one process of forming lithium metal anodes according to the prior art includes lithium metal that is plated onto a solid electrolyte interphase ("SEI") film. This is believed to cause cracks in the SEI film. As additional lithium metal is plated, the lithium dendrites form in the spaces, voids, or cracks. The plated SEI film then undergoes a process to strip the lithium dendrites from the plated SEI film. At the same time, the plated SEI film shrinks or contracts, resulting in further fracturing. As the anode is cycled, the isolated lithium dendrites accumulate and form a layer of "dead" lithium on the surface of the plated SEI film, resulting in a thick layer of SEI film and a porous electrode. These properties result in reduced efficiency, short circuits and capacity fading.

While attempts have been made in the prior art to mitigate dendrite formation, none of them offered a practical and cost-effective solution to administer solid-state particles with multifunctional properties to the lithium metal anode.

Accordingly, it is an object of the invention to provide lithium metal anodes that have reduced dendrite formation and have more uniform surface topography.

It is a further object to provide a robust, practical and cost-effective process to manufacture lithium metal anodes by administering solid-state particles with multifunctional properties directly or indirectly to the lithium metal anode.

It is an additional objective of the present invention to provide a solid lithium metal anode with one or more particles attached, added, or otherwise embedded in the surface or throughout the portion of lithium metal to mitigate lithium dendrite growth.

It is another objective of the present invention to provide a lithium metal anode defining a laminate with a copper foil that has been directly or indirectly treated with one or more particle groups with multifunctional properties, the particle groups selected from: (1) polymers; (2) organic materials that can be used in any electrolyte materials; (3) inorganic materials that can be dissolved in solvents, polarizable lithium salts, non-polarizable lithium salts and combinations thereof; and (4) metallic and non-metallic lithiophilic materials, and mixtures thereof.

It is a further objective to provide one or more methods of manufacturing the aforementioned lithium metal anode(s).

These and other object will become apparent upon a further reading of the specification with reference to the drawing figures and appended claims.

SUMMARY OF THE INVENTION

The invention concerns lithium metal anodes in which one or more groups of multifunctional particulate material is/are added or embedded on or within the anode, forming a lithium metal composite anode. In one embodiment, particulate materials are selected from (1) polymers; (2) organic materials that can be used in any electrolyte materials; (3) inorganic materials that can be dissolved in solvents, polarizable lithium salts, non-polarizable lithium salts and combinations thereof; and (4) metallic and non-metallic lithiophilic materials, and mixtures thereof. The particulate materials must satisfy at least one of the following criteria: (a) at least partially soluble in non-aqueous electrolytes including liquid and solid electrolytes; (b) causes a change in viscosity of the electrolyte after activating; (c) causes a change in ionic conductivity after activating; (d) causes a change in lithium diffusion coefficient after activating; and/or (e) causes a decrease in surface topography after activation. Alternatively, the particulate material may be insoluble but dispersible in non-aqueous electrolytes including liquid and solid electrolytes. The composite lithium metal anodes of the invention are preferably prepared by distributing the particulate materials directly onto a portion of lithium metal, or indirectly via a polymer substrate, adding a portion of lithium metal or polymer substrate over the particles to form a laminate, and introducing the laminate into a nip formed between two rollers in a press to add, press, and/or embed the particulate materials at least partially into the portion of lithium metal.

DETAILED DESCRIPTION OF THE PREFERRED EMBODIMENT AND OPERATION OF THE INVENTION

Figure 1:
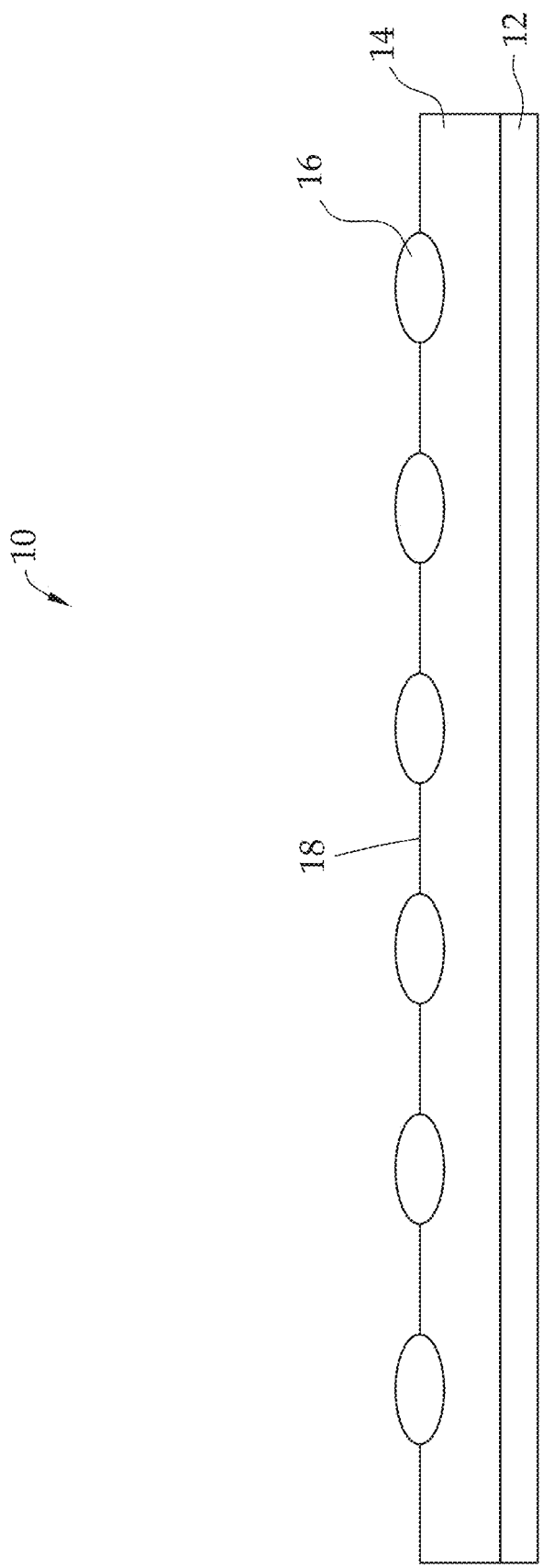
FIG. 1 is a schematic illustration of a first embodiment of a lithium metal anode in accordance with the invention, specifically illustrating particulate materials embedded on the surface of a lithium metal film layer.
Figure 2:
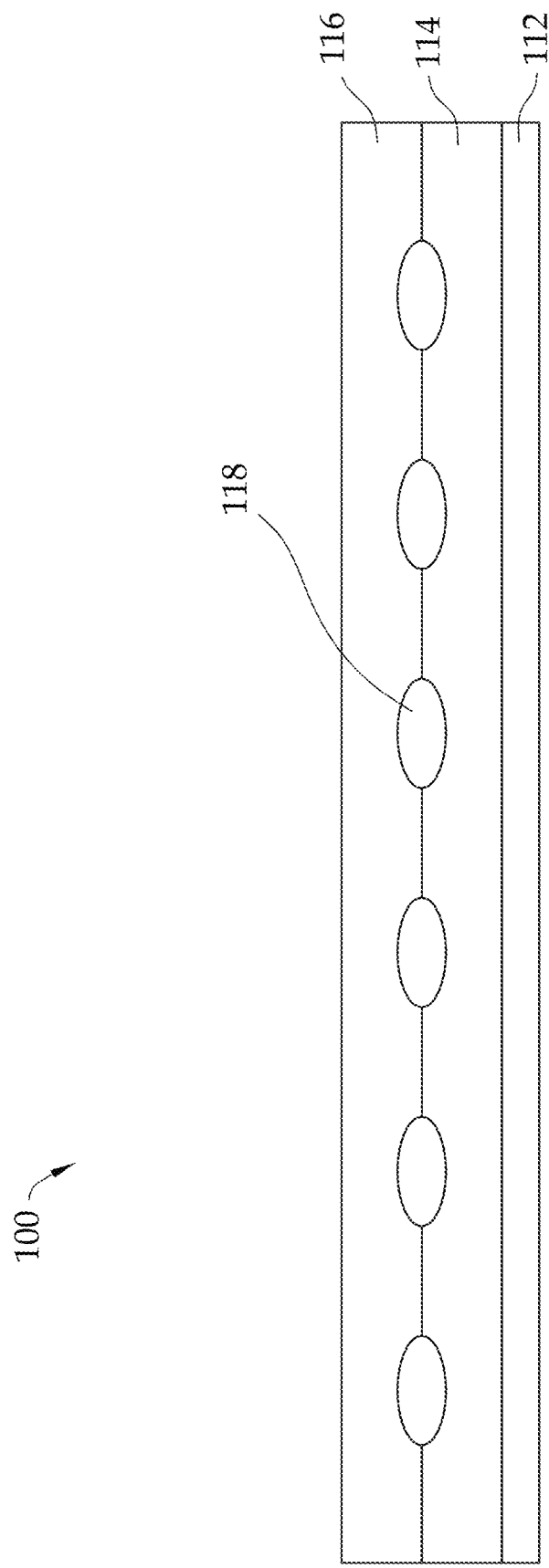
FIG. 2 is a schematic illustration of an alternate embodiment of a lithium metal anode in accordance with the invention, specifically illustrating a layer of particulate materials embedded between two layers of lithium metal film.
Figure 3:
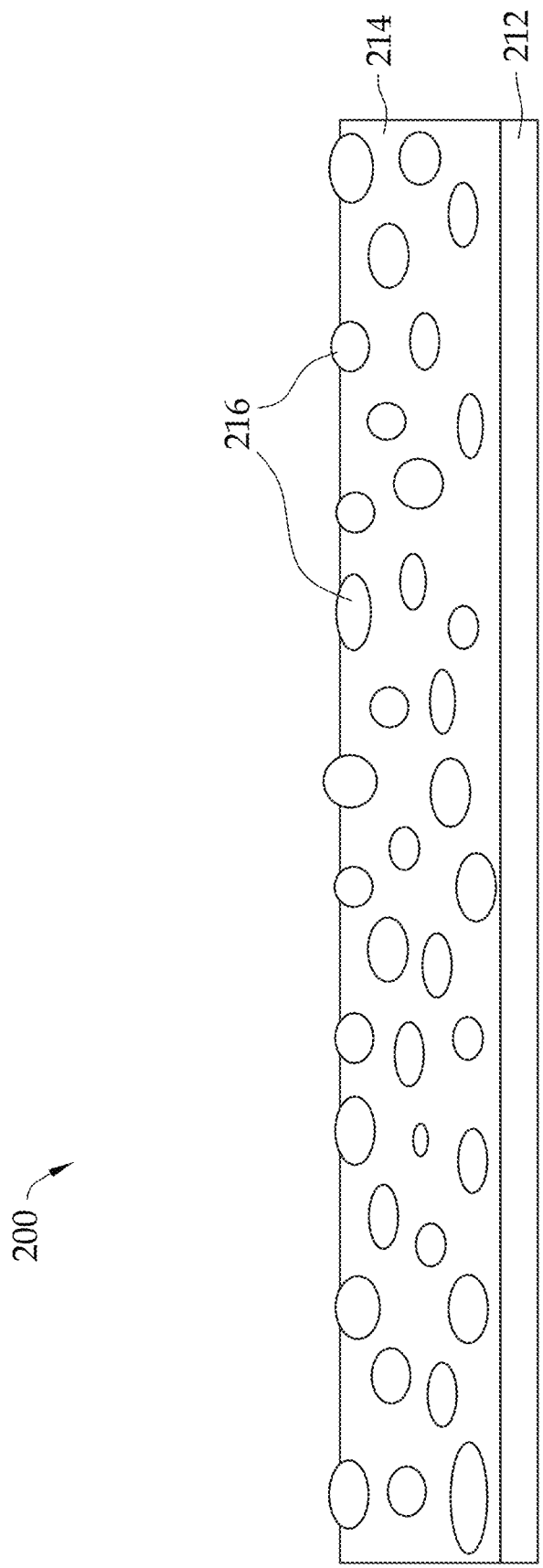
FIG. 3 is a schematic illustration of an alternate embodiment of a lithium metal anode in accordance with the invention, particularly illustrating particulate materials embedded and dispersed throughout a lithium metal film.

With reference to FIGS. 1-3, the one or more anodes of the invention include at least a portion of lithium metal and one or more particulate materials. In the embodiment shown in FIG. 1, the lithium anode 10 has a layer of a current collector, such as copper foil 12 and a layer of lithium metal 14 overlying the layer of copper foil 12, but it should be understood that embodiments of the instant invention are satisfactory without the current collector layer. A plurality of one or more particulate materials 16 are added to the surface 18 of lithium portion 14 or embedded throughout lithium metal portion 14. In the embodiment of FIG. 2, the anode 100 has a layer of copper foil 112, a first layer of lithium metal 114 overlying the layer of copper foil 112, and a second layer of lithium metal 116 overlying the first layer of lithium metal 114, preferably forming a laminate. A plurality of one or more particulate materials 118 are added and/or embedded between the first layer of lithium metal 114 and the second layer of lithium metal 116. In the embodiment of FIG. 3, the anode 200 includes a layer of copper foil 212 and a layer of lithium metal 214 overlying the layer of copper foil 212. A plurality of one or more particulate materials 216 are dispersed, be it randomly or intentionally, throughout the layer of lithium metal 214 and on the surface of the lithium layer 214.

Figure 4:
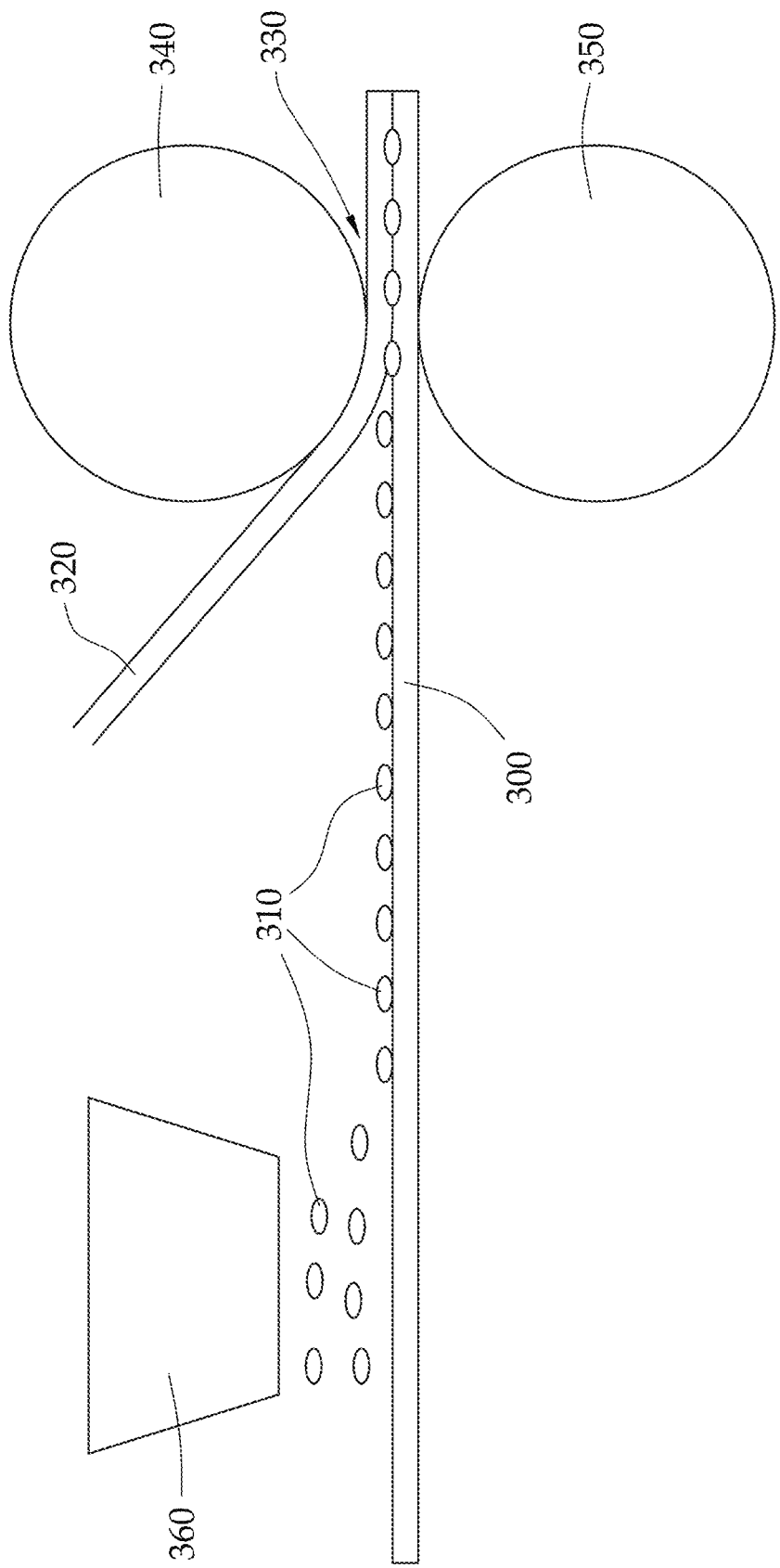
FIG. 4 is a schematic illustration of the process for making the lithium metal anodes of the invention.

One preferred process of making the lithium metal anodes of the invention is generally described as a roll coating process in which a plurality of one or more particulate material(s) is/are distributed, added, or deposited onto the surface of a layer of material and then introduced into a nip formed between two press rollers to at least partially press or embed the particulate materials into the layer of material. The prior art teaches the use of a lubricant to prevent the lithium metal from sticking to the roller(s), but such is not preferred because the lubricant is considered a contaminant and may negatively impact the properties of the final lithium metal anode. With particular reference to FIG. 4, the process may include the steps of: (1) providing a first layer 300; (2) adding, depositing, or otherwise distributing one or more groups of particulate material 310 onto the surface of the first layer 300; (3) providing a second film layer 320 into contact with the particulate material 310 to "sandwich" or laminate the particulate material 310 between the first layer 300 and the second film layer 320, wherein at least one of the layers comprised lithium metal or lithium metal alloy; and (4) passing the film layer 300 and the second film layer 320 with the one or more groups of particulate material 310 laminated therebetween through a nip 330 formed between an upper press roller 340 and a lower press roller 350 to at least partially attach, press, or embed the one or more groups of particulate material 310 into the lithium metal or lithium metal alloy. This process of solid-state application may be considered a "direct" application process, in that the solid-state application process of the multifunctional particulate material ("multifunctional in this context means an additive to the lithium metal beyond the purpose of reducing the coefficient of adhesion of the lithium metal so that it does not become stuck on the rollers) occurs directly onto the portion of lithium metal.

Figure 5:
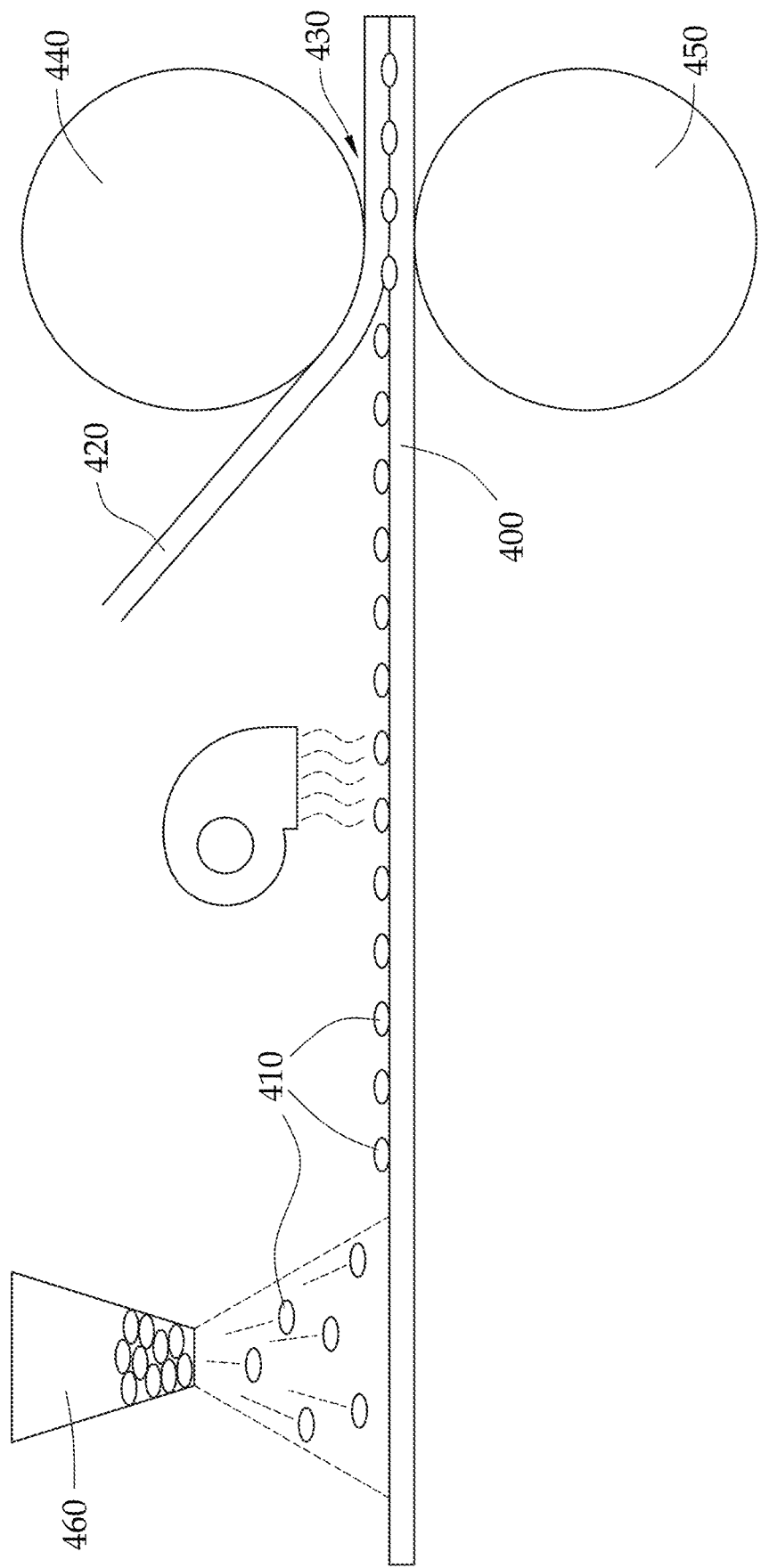
FIG. 5 is a schematic illustration of an alternate process for making the lithium metal anodes of the invention.

In an alternate embodiment, and with particular reference to FIG. 5, the process may include the steps of: (1) providing a first film layer 400; (2) depositing one or more groups of particulate material 410 onto the surface of the first layer 400; (3) evaporating all solvent, and any other moisture away from the first layer 400, leaving the one or more groups of particulate material 410 therein (considered herein a "solid-state" application process due to the removal of most or all liquid given the highly reactive nature of pure lithium); (4) providing a second layer 420 into contact with the particulate material 410 to "sandwich" or laminate the particulate material 410 between the first film layer 400 and the second layer 420, wherein at least one of the layers comprised lithium metal or lithium metal alloy; and (5) passing the film layer 400 and the second layer 420 with the one or more groups of particulate material 410 laminated therebetween through a nip 430 formed between an upper press roller 440 and a lower press roller 450 to at least partially attach, press, or embed the one or more groups of particulate material 410 into the lithium metal or lithium metal alloy. Although not demonstrated in these figures, it may be desirable to further include a bare carrier layer so as to prevent sticking or contamination, particularly of the lithium metal. This process of solid-state application may be considered an "indirect" application process, in that the solid-state application process of the multifunctional particulate material occurs first onto the film layer, and then onto the portion of lithium metal via the rollers.

After passing the first lithium metal layer, the second film layer and particulate material through the nip, the second film layer may be stripped away, leaving a lithium layer with the one or more groups of particulate materials at least partially added and/or embedded on the exposed, exterior surface thereof, as illustrated in FIG. 1. If the second film layer is left in place, the resulting anode would have the one or more groups of particulate materials at the interface of the first film layer and the second film layer, as illustrated in FIG. 2. Additionally, or in the alternative, the resulting anode may have one or more groups of particulate materials embedded into the width of the first lithium metal layer. To achieve the embodiment of the anode 200 as illustrated in FIG. 3, the second film layer can be stripped away, the first lithium layer with particulate material can be folded upon itself and then passed through the nip again one or more times to randomly or intentionally distribute the particulate material throughout the resulting anode width. Additionally, or in the alternative, the resulting anode 200 may have one or more groups of particulate materials embedded into the width of the first lithium metal layer without any need to fold the lithium metal and film layers upon themselves, due to the pressing through the nip. Once the desired anode structure is obtained, the lithium layer may laminated to a copper foil or other material suitable for use as a current collector. Alternatively, the resulting anode structure may be mounted to a transfer layer, and need not include the current collector as may be desired.

In the process, the first lithium metal layer 300 may be a layer of lithium metal, a layer of lithium alloy, a layer of lithium metal supported by a polymer substrate, or a polymer substrate. Similarly, the second film layer 320 may be a layer of lithium metal; a layer of lithium metal alloy, a layer of lithium metal supported by a polymer substrate, or a layer of polymer substrate. It is preferably as an element of the instant invention that at least one of film layers include pure lithium metal in intimate contact with the one or more groups of particulate material 310. As used in this context, "pure" lithium is considered acceptable if it is substantially consisting of only lithium, considered as 99.9% or more of lithium metal.

The step of depositing, adding, or otherwise distributing the one or more groups of particulate material 320 onto the surface of the first lithium metal layer 300 may be accomplished by passing the first lithium metal layer 300 under a feeder device 360 containing one or more groups of the particulate material 310. The feeder device 360 may be a dry powder feeder device, a spray device, or other manner of distribution apparatus as known in the art, depending on whether the particulate material 310 is to be applied in dry form (i.e. solid-state application process) or as a spray. Alternately, the particulate material 310 may be deposited onto a first film layer which acts as a transfer layer. In this embodiment, the first film layer may be, for example (but not intended to be a limitation), a polymer substrate to act as a transfer layer and the second layer may include the layer of lithium metal or lithium metal alloy. As the film layers are passed through the nip, the one or more groups of particulate materials are transferred from the surface of the first film layer onto the exterior surface layer of lithium metal or metal alloy.

Suitable materials for use as the polymer substrate film layer may be of any suitable film layer, with polyolefin polymers such as polyolefin and polypropylene being particularly preferred. The term "polymers" as used herein includes both homopolymers and copolymers. The polymer substrate film layers used in the present invention may be unoriented or oriented in either the machine direction, the cross direction or biaxially oriented film layers. Similarly, the films layers may be monolayer materials or laminated film layers, such as polypropylene/polyethylene/polypropylene tri-layer film.

The particulate materials used in formation of one or more of the preferred lithium anodes as described above are preferably micron or sub-micron size particles defining a size of 100 microns or less, more preferably defining a size of 10 microns or less, and most preferably defining a size of 1 micron or less. The particulate material(s) are preferably selected from one or more of the following groups:

Group 1: polymers;
Group 2: organic materials that can be used in any electrolytes and that dissolve in carbonate and non-carbonate solvents;
Group 3: inorganic materials that can be dissolved in solvents, polarizable lithium salts, non-polarizable lithium salts and combinations thereof; and
Group 4: metallic and non-metallic lithiophilic materials.

The preferred particulate materials must also satisfy at least one or more of the following criteria:
(a) is at least partially soluble in non-aqueous electrolytes, including liquid and solid electrolytes;
(b) causes a change in viscosity of the electrolyte after activating;
(c) causes a change in ionic conductivity after activating;
(d) causes a change in lithium diffusion coefficient after activating; or
(e) causes a more uniform surface topography after activation.

Alternatively, the selected particulate material may be insoluble, but dispersible, in non-aqueous electrolytes, including liquid and solid electrolytes.

Examples of preferred particulate materials in Group 1 include (but are not limited to) polyolefin-based materials, polymer and/or co-polymer films such as polyacrylonitrile; polyvinylidene difluoride, polyethylene oxide; polyethylene, polypropylene, polyvinyl chloride, polyphthalate, polytetrafluoroethylene, polyimide, polyester, polyurethane, nylon, cellulose, lignin, combinations thereof, and blends such as PP/PE/PP, and the like. Examples of preferred materials in Group 2 include (but are not limited to) organic materials suitable for use as electrolytes such as ethylene carbonate (EC), propylene carbonate (PC), diethyl carbonate (DEC), dimethyl carbonate (DMC), ethyl-methyl carbonate (EMC), r-butyrolactone, ether based materials, vinylene carbonate (VC), vinylethylene carbonate (VEC), propane sulfone, cyano molecules including mono and dicyano molecules, and any others can be dissolved in carbonate and non-carbonate solvent; and combinations thereof. Some examples of particulate materials from Group 3 include (but are not limited to) inorganic materials that may be dissolved in solvents and/or either or both polarizable and non-polarizable lithium salts such as lithium bis(trifluoromethanesulfonyl)imide, lithium bis(fluorosulfonyl)imide, lithium hexafluoroarsenate ($LiAsF_6$), lithium hexafluorophosphate ($LiPF_6$), lithium tetrafluoroborate ($LiBF_4$), lithium perchlorate ($LiClO_4$), lithium bis(oxalato)borate, lithium(difluorooxalato) borate, $NaNO_3$, $CsNO_3$, $RbNO_3$, $KNO_3$, $AgNO_3$, $NH_4NO_3$, $Ba(NO_3)_2$, $Sr(NO_3)_2$, $Mg(NO_3)_2$, $Ca(NO_3)_2$, $Ni(NO_3)_2$, $Co(NO_3)_2$, $Mn(NO_3)_2$, $Al(NO_3)_3$, $Ce(NO_3)_3$, lithium nitrate ($LiNO_3$) and combinations thereof. Preferred particulate materials from Group 4 include (but are not limited to) aluminum, silver, gold, zinc, magnesium, silicon, tin, germanium, indium, barium, bismuth, boron, calcium, cadmium, iridium, palladium, platinum, rhodium, antimony, selenium, strontium, tellurium, $MnO_2$, $Co_3O_4$, $SnO_2$, $SiO_2$ ($SiO_x$), $ZnO$, $Al_2O_3$, $Li_{1.3}Al_{0.3}Ti_{1.7}(PO_4)_3$, $Li_{1.5}Al_{0.5}Ge_{1.5}$ ($PO_4$)$_3$, $Li_7La_3Zr_2O_{12}$, $Li_{0.33}La_{0.557}TiO_3$, $Li_2O$—$SiO_2$—$TiO_2$—$P_2O_5$ and lithiophilic carbonaceous materials such as any nanostructured carbon materials included reduced graphene, N-doped graphene, surface modified graphene.

In the Group 1, 2, and 4, after the first cycle, the particulate material may be dissolved in existing electrolyte and contribute to change viscosity of electrolyte, lithium-ion conductivity, lithium diffusion coefficient and eventually will impact on tortuosity of lithium metal surface. In addition, the active void site after the particulate material comes out will provide a new home for lithium ion transfer and can increase lithium-ion flux thus kinetically lithium ion transfer faster than before. Embodiments of the particulate material may not ionically interfere and thus can be easily chosen based on the preferred application. For instance, the particulate may be a polymer material dissolved in conventional electrolyte(s) and leads to increase viscosity of electrolyte. If the electrolyte becomes more viscous after cycling, then the dead lithium will not grow as same as one in the conventional liquid electrolyte. Therefore, the preferred particulate material is the one that can control kinetic rate of dead lithium growth and eventually improve the cycle life of battery compared to any other lithium metal anode known in the art.

In group #3, the preferred particulate material is defined as lithium nitrate ($LiNO_3$) because the nitrate ion has a higher decomposition potential (around 1.7V vs Li+) compared any other carbonate electrolytes. However, the nitrate has much lower dissolution in any carbonate solution due to lower donor number. Many approaches have been tried to improve the solubility limitation such as polymer electrolyte with the nitrate additive. However, the prior art required multiple steps in the process of adding a nitrate into the electrolyte and limited the application for any lithium ion batteries. The direct, and more preferably the indirect process(es) provided here are the best way to improve the solubility of lithium nitrate over the battery operation and most cost-effective process to significantly advance the lithium metal anode performance.

In some embodiments, the particulate materials may also be characterized as having a surface area greater than 0.1 $m^2$/g and electrical conductivity greater than 100 S/cm.

In an embodiment, the particulate material is a polymer that dissolves in the electrolyte and causes an increase in the viscosity of the electrolyte after activating (i.e., cycling). As the electrolyte becomes more viscous, the rate at which the dead lithium layer grows is decreased, resulting in a battery with improved cycle life.

EXAMPLES

The cells were built in an Argon-filled glovebox with moisture levels below 0.5 ppm and oxygen level below 0.1 ppm. 1 M $LiPF_6$ in a mixed solvent of ethylene carbonate/Diethyl carbonate (1:2 volume ratio) was used as electrolyte, and Celgard 2320 separator (Tri-layer, PP/PE/PP) was used to build a coin cell.

Example #1

Two symmetrical battery cells were prepared, one cell comprised conventional lithium anodes and the other comprised the lithium metal anodes of the present invention. The cells were subjected to sequential stripping/plating cycles conducted at 1 mA/$cm^2$ for one hour per cycle. Tests were conducted in an electrolyte solution of ethylene carbonate (EC):diethyl carbonate (DEC) [1:2, v:v] in 1 M $LiPF_6$. The voltage of each cell was measured during the repeated stripping and plating cycles. Results are plotted in the graph of FIG. 6.

Figure 6:
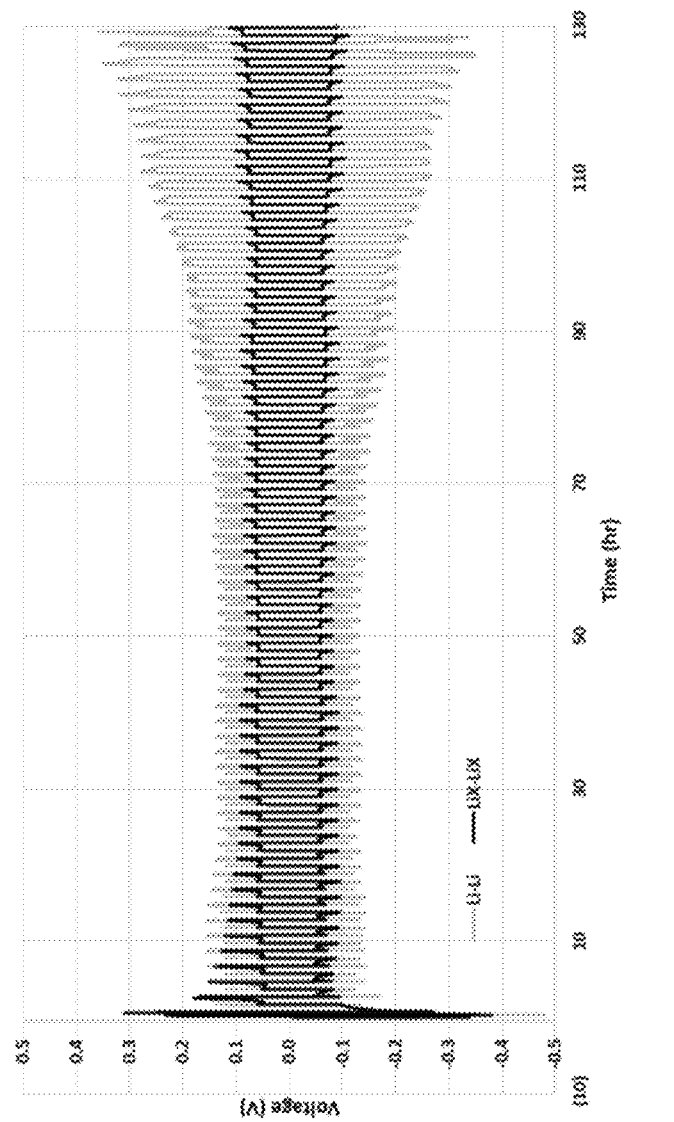
FIG. 6 is a graph demonstrating a conventional lithium metal anode and a lithium composite metal anode of the present disclosure.

As can be seen in the graph of FIG. 6, the control cell (indicated by the "Li—Li" lines) exhibited a larger voltage hysteresis during lithium deposition and dissolution and significantly increased overpotential after 70 hours (35 cycles of stripping and plating). In contrast, the cell comprised of the lithium composite anodes of the invention (indicated by the lines designated "LiX—LiX") demonstrated very stable and minimal overpotential up to about 130 hours.

Example #2

Li metal anodes were manufactured through the inventive process and resulting composition of the instant invention. Li metal electrode defining a 45 micron thickness were punched into a disc shape (diameter of 16 mm). Li—Li symmetric cells were assembled with CR2032 coin cell each having two Li metal electrodes. Electrochemical stripping/plating test of the Li—Li symmetric cell was conducted at (1) 0.1 mA/$cm^2$ for each 30 min during stripping/plating on 1st cycle, (2) 0.25 mA/$cm^2$ for 30 min on 2nd cycle, (3) 0.5 mA/$cm^2$ for 30 min on 3rd cycle, (4) 1 mA/$cm^2$ for 1 hour (Aerial Capacity: 1 mAh/$cm^2$) from 4th cycle to the end of test. The life of the Li—Li symmetric cells was determined as the time for the overpotential to increase to 0.2V.

Example #3

Figure 7:
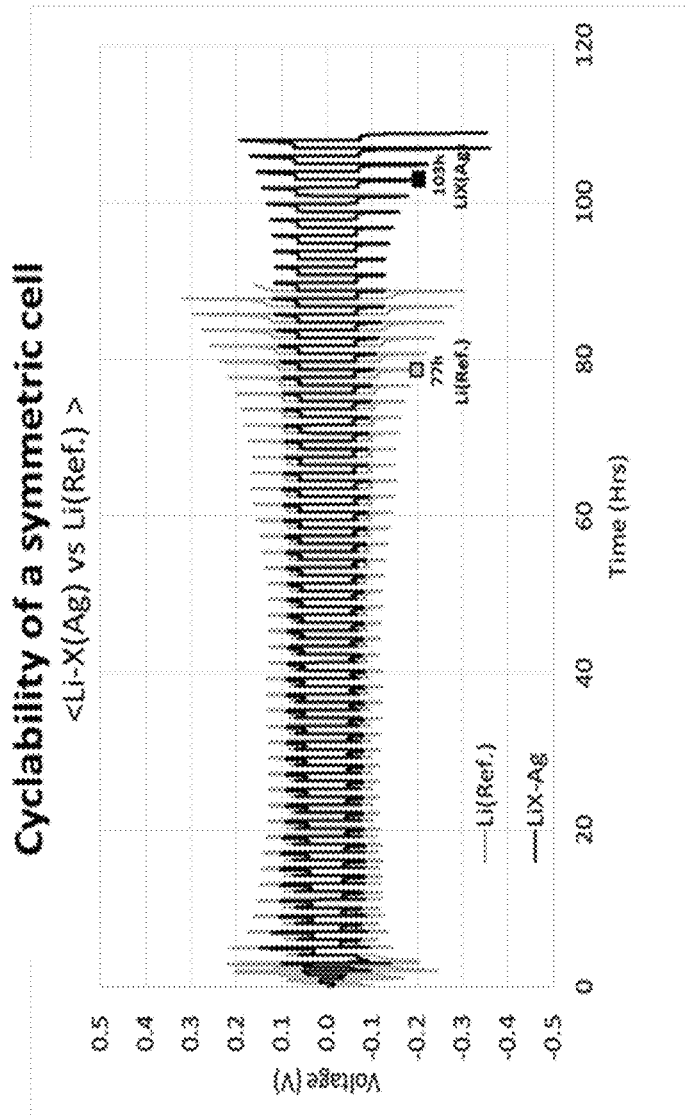
FIG. 7 is a chart demonstrating the galvanostatic cycling voltage profiles for a Li—Ag metal anode of the present disclosure and a bare Li metal anode.

The tested coin cells were manufactured using a lithium metal electrode according to the instant invention, an organic liquid electrolyte and an NCA positive electrode. To prepare the positive electrode, poly(vinylidene fluoride) (PVDF) as a binder was dissolved in N-methyl pyrrolidone, then Super-P as conductive carbon, and $LiNi_{0.8}Co_{0.15}Al_{0.05}O_2$(NCA) as an active material were mixed together. The positive electrode active material, the conductive material and the binder had a weight ratio of 94:3:3. After coating the completely mixed slurry solution on an aluminum foil, and drying the cathode electrode in the vacuum condition, a calendaring process was carried out using a roll press. The cycling performance of NCA-Li full cells was evaluated in the voltage range of 3.0-4.4V under 1C charge/1C discharge condition. The chart of FIG. 7 demonstrates galvanostatic cycling voltage profile for Li—Li symmetric cells cycled at 1 mAh/$cm^2$(1 mA/$cm^2$ at 1 hr for each stripping and plating) on LiX [in this case "X" is defined as Ag from one of the groups above] metal anode and bare Li metal as the control anode (comparative reference) through direct X embedded process.

Figure 8:
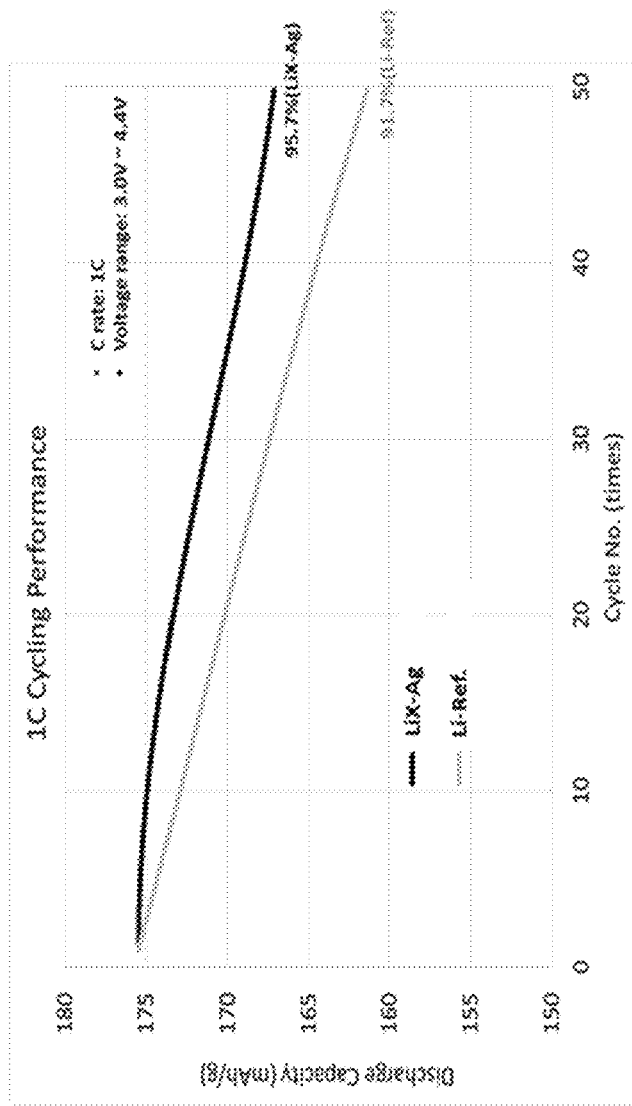
FIG. 8 is a chart demonstrating the 1C cycling performance of a NCA-Li—Ag cell and a NCA-bare Li cell.

The lifespans of Li—Ag metal anode and bare Li metal are 103 hrs and 77 hrs, respectively, so the lifetime of Li—Ag has improved by about 34%. Furthermore, 1C cycling performance of NCA-Li—Ag and NCA-bare Li cells is demonstrated in the chart of FIG. 8.

The NCA-LiX(Ag) cell exhibits capacity retention ratio (hereafter, CRR) of 95.7% after 50 cycles. In contrast, the CRR of NCA-bare Li is 91.7% after 50 cycles, which means that the Li—Ag has 4% point higher CRR value compared to bare Li(reference) material.

Example #4

Figure 9:
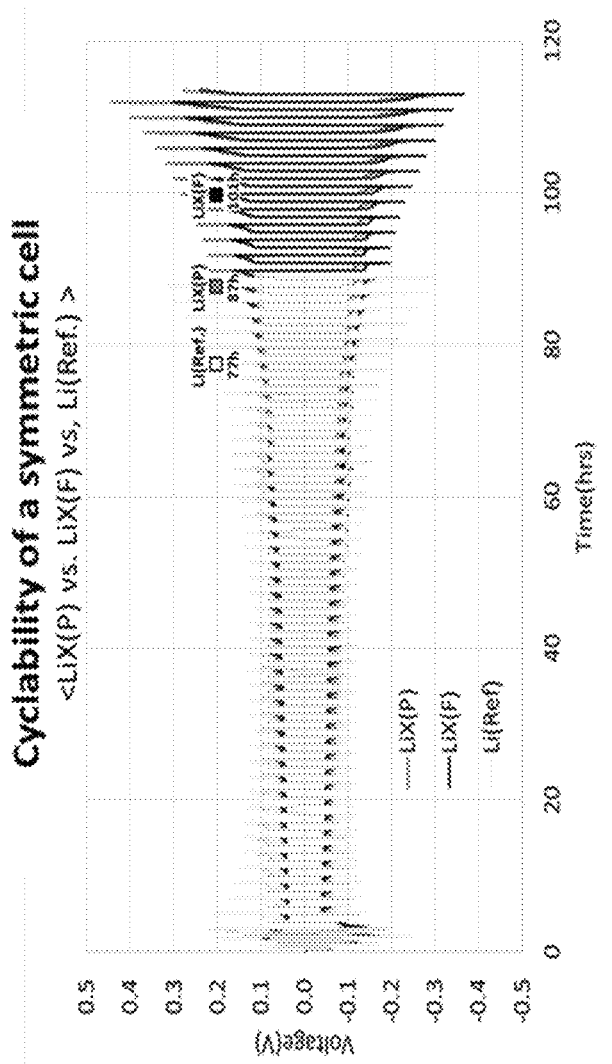
FIG. 9 is a chart demonstrating the galvanostatic cycling voltage profiles for a Li-PAN metal anode of the present disclosure, a Li—LiPF6 metal anode of the present disclosure, and a bare Li metal anode.

The galvanostatic cycling voltage profile for one or more of the Li—Li symmetric cells described above cycled with Li—X [in this case "X" is defined as PAN(hereafter, 'P') and LiPF$_6$(hereafter 'F') from the groups described above] metal anodes and bare Li metal through direct X (i.e. P and F) embedded process demonstrated in the chart of FIG. 9.

Figure 10:
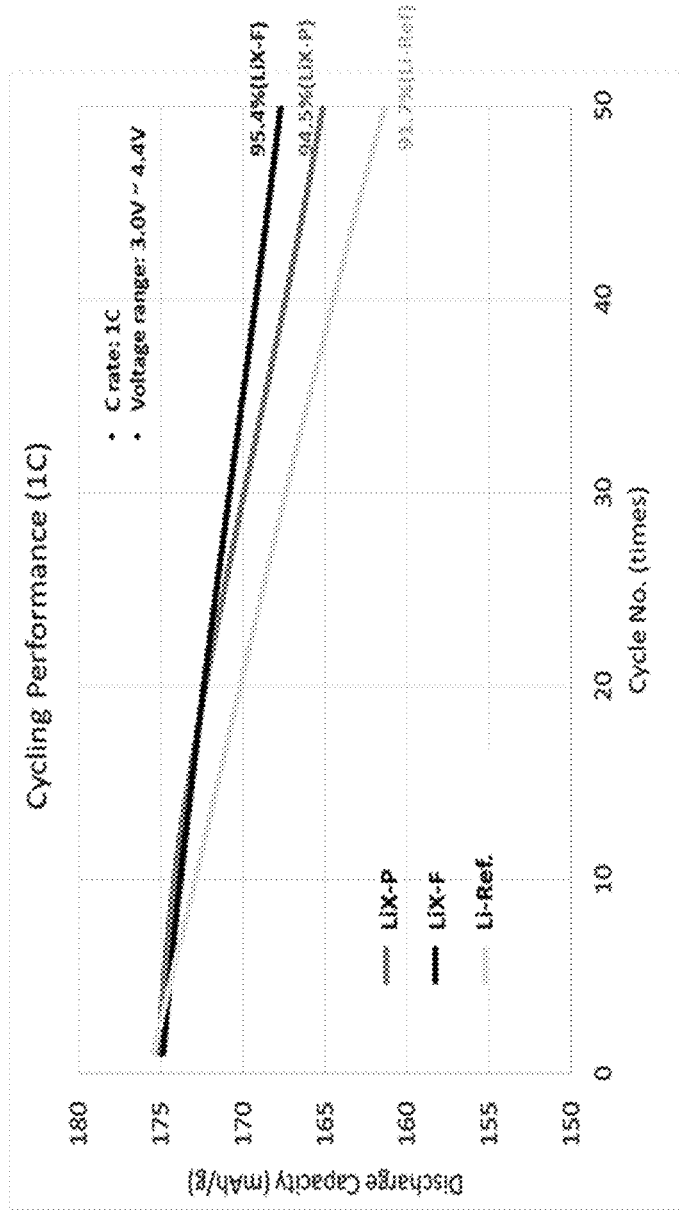
FIG. 10 is a chart demonstrating the 1C cycling performance of a NCA-Li-PAN cell, a NCA-Li—LiPF6 cell, and a NCA-bare Li cell.

Herein, the lifespans of Li(P) and Li(F) metal anode and bare Li metal are 87 hrs, 101 hrs and 77 hrs, thus, the lifetime of Li—(P) and Li(F) is improved by about 13%, 31% compared to bare Li. 1C cycling performance of NCA-LiX (P), NCA-LiX(F) and NCA-bare Li cells is shown in the chart of FIG. 10.

The NCA-LiX(P), NCA-LiX(F) and NCA-bare Li cells exhibits CRR of 94.5%, 95.4%, 91.7% after 50 cycles. The NCA-Li(P) and Li(F) cells are improved by 2.8 and 3.7% in terms of CRR, compared to bare Li.

Example #5

Figure 11:
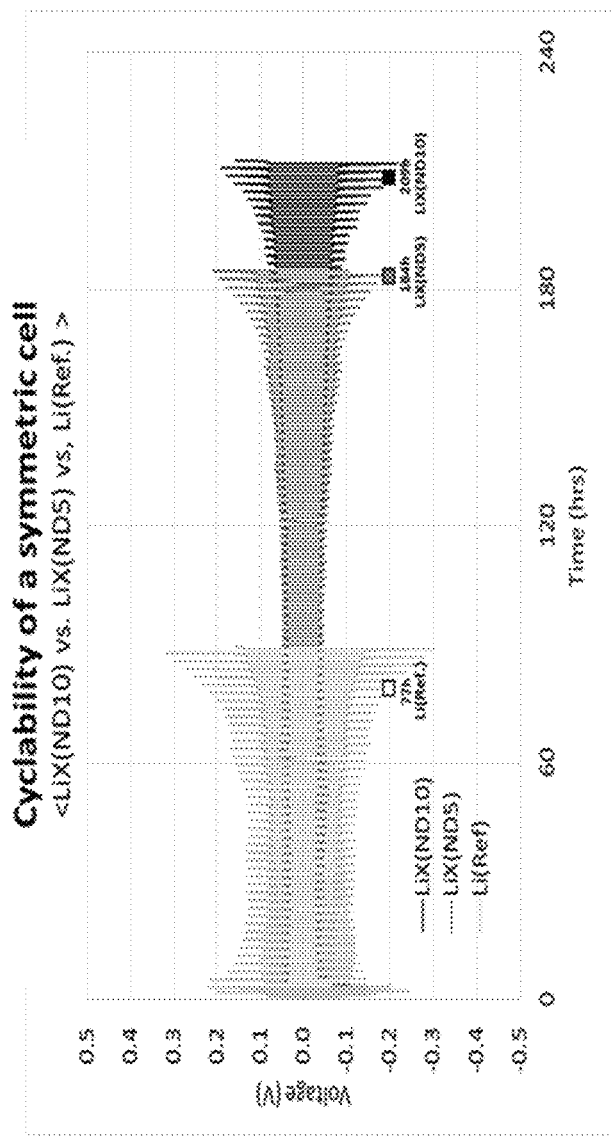
FIG. 11 is a chart demonstrating the galvanostatic cycling voltage profiles for a Li—LiNO3 metal anode of the present disclosure, a Li—LiNO3 metal anode of the present disclosure, and a bare Li metal anode.

The galvanostatic cycling voltage profile for Li—Li symmetric cells described above cycled on Li—X [in this case "X" is defined as LiNO$_3$ (hereafter, 'N') from one of the groups described above] metal anodes and bare Li metal through direct X embedded process as demonstrated in the chart of FIG. 11.

Figure 12:
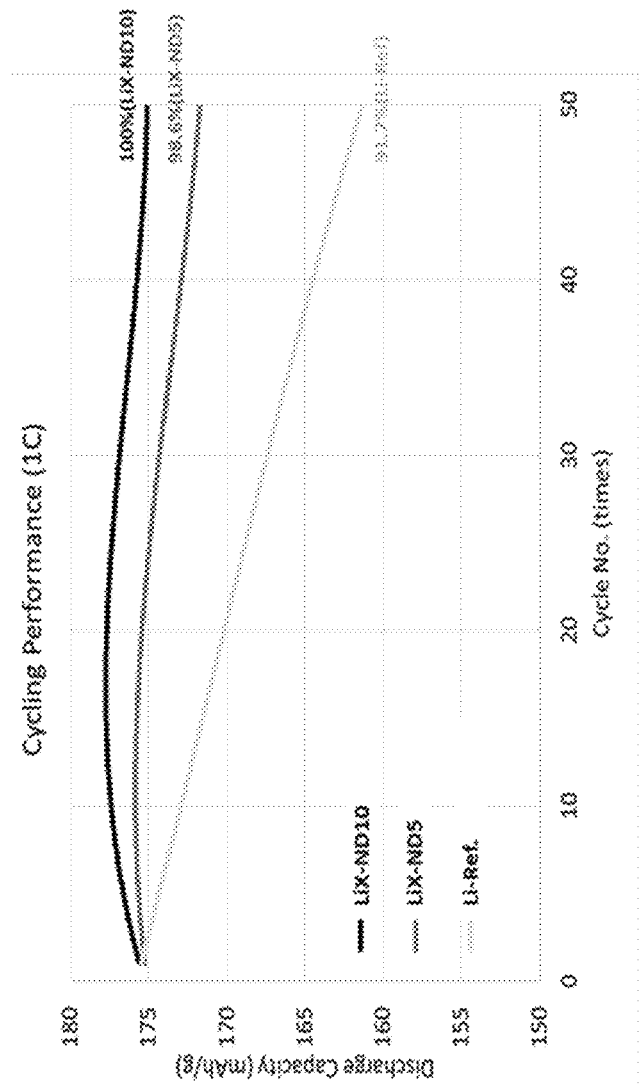
FIG. 12 is a chart demonstrating a comparison between the 1C cycling performance of a NCA-Li—(ND10) cell, a NCA-Li—(ND5) cell, and a NCA-bare Li cell.

Herein, 'ND10' means the short of 'LiNO$_3$'-'Direct X embedded process'-'10% LiNO$_3$ in Li metal strip'. The lifespans of Li(ND10) and Li(ND5) metal anode and bare Li metal are 209 hrs, 184 hrs and 77 hrs, respectively. Thus, the lifetime of Li—(P) and Li(F) is improved by about 170%, 140%, compared to bare Li. 1C cycling performance of NCA-Li(ND10), NCA-Li(ND5) and NCA-bare Li cells as shown in the chart of FIG. 12.

The cells exhibit CRR of 100% (ND10), 98.6% (ND5), 91.7% (Bare Li-Ref) after 50 cycles. The CRR of NCA-Li (ND10) and Li(ND5) cells are improved by 8.3 and 6.9%, respectively compared to bare Li.

Example #6

Figure 13:
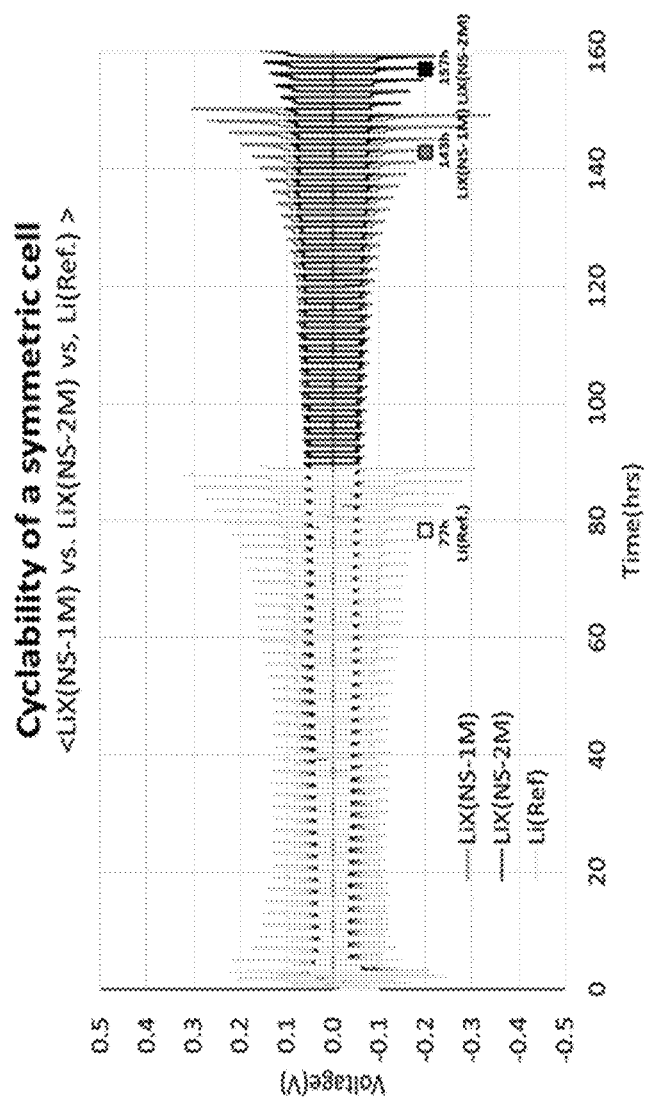
FIG. 13 is a chart demonstrating the galvanostatic cycling voltage profiles for a Li—LiNO3 metal anode of the present disclosure, a Li—LiNO3 metal anode of the present disclosure, and a bare Li metal anode.

The galvanostatic cycling voltage profile for Li—Li symmetric cells described above cycled on Li—X [in this case "X" is defined as LiNO$_3$ (hereafter, 'N') from one of the groups above] metal anodes and bare Li metal anode through Indirect X embedded process in the chart of FIG. 13.

Figure 14:
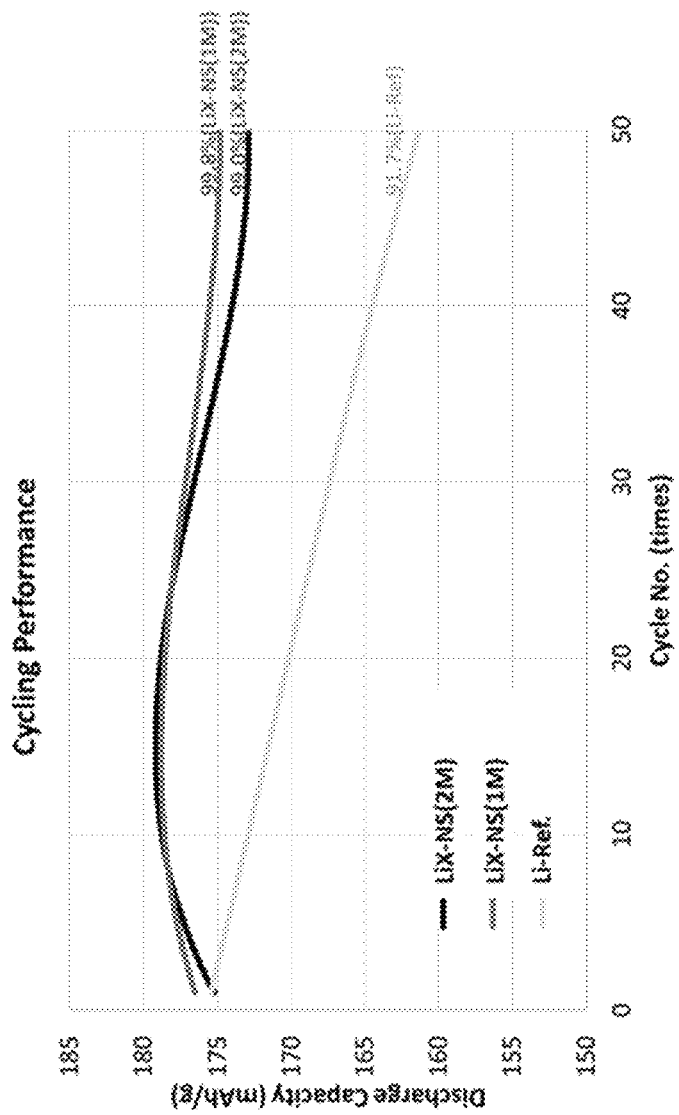
FIG. 14 is a graphic demonstrating the 1C cycling performance of a NCA-Li—(NS-1M) cell, a NCA-Li—(NS-2M) cell, and a NCA-bare Li cell.

For example, 'NS-2M' is short for 'LiNO$_3$'-'Indirect (Spray) X embedded process'-'2 Mol LiNO$_3$ in solvent (Ethanol)'. The lifespans of LiX(NS-1M) and LiX(NS-2M) metal anode and bare Li metal are 143 hrs, 157 hrs and 77 hrs, respective. Thus, the lifetime of LiX(P) and LiX(F) is improved by about 86%, 104%, compared to bare Li. 1C cycling performance of NCA-LiX(NS-1M), NCA-LiX(NS-2M), NCA-LiX(NS-4M) and NCA-bare Li cells as illustrated in the graphic of FIG. 14.

The cells exhibits CRR of 99.8% (NS-1M), 99.0% (NS-2M), 96.3% (NS-4M), 91.7% (Bare Li-Ref.) after 50 cycles. The CRR of NCA-Li(NS-1M), NCA-Li(NS-2M), NCA-Li (NS-4M) cells are improved by 8.1 and 7.3, and 4.6% point, respectively, compared to bare Li.

The embodiments shown and described in the preceding description are for illustration and explanation only and are not intended to limit the scope of the invention in the appended claims.

We claim:

1. A method of forming a lithium metal anode for a battery, the method comprising,
    adding, via a solid-state process, one or more particulate material(s) on at least a part of a portion of pure lithium metal, the one or more particulate material(s) comprising a plurality of particles, wherein the one or more particulate materials are applied directly on the portion of pure lithium metal in a dry form via a spray or a dry powder feeder device, wherein the lithium metal comprises pure lithium metal, and
    pressing the portion of pure lithium metal and the one or more particulate material(s) so as to embed the one or more particulate material(s) into the surface and throughout the interior of the portion of pure lithium metal, wherein the pressing includes introducing the portion of pure lithium metal with the one or more particulate material(s) in between two press rollers such that the portion of pure lithium metal is not folded upon itself before or after the pressing,
    wherein the one or more particulate material(s) inhibit or eliminate formation of a dendrite, wherein the one or more particulate material(s) is at least partially soluble in a non-aqueous electrolyte, and wherein each particle of the one or more particulate material(s) has a continuous rounded surface defining a discrete interface contacting the pure lithium metal surrounding the particle.

2. The method of claim 1, wherein the one or more particulate material(s) define(s) at least one of the following properties:
    (a) the one or more particulate material(s) cause a change in viscosity of an electrolyte after activating; (b) the one or more particulate materials(s) cause a change in ionic conductivity after activating; (c) the one or more particulate material(s) cause a change in lithium diffusion coefficient after activating; and (d) the one or more particulate material(s) cause a change in surface topography on a surface of the portion of lithium metal after activation.

3. The method of claim 1, wherein the one or more particulate material(s) is/are selected from the group consisting essentially of polymers; organic materials that are used in an electrolyte and that dissolve in carbonate and non-carbonate solvents; and metallic and non-metallic lithiophilic materials; and combinations thereof.

4. The method of claim 1, wherein the one or more particulate material(s) is/are defined as a polymer selected from polyacrylonitrile; polyvinylidene difluoride, polyethylene oxide; polyethylene, polypropylene, polyvinyl chloride, polyphthalate, polyimide, polyester, polyurethane, nylon, cellulose, lignin, and polytetrafluoroethylene, and combinations thereof.

5. The method of claim 1, wherein the one or more particulate material(s) is/are defined as an inorganic compound, whether dissolved in a solvent or not, selected from lithium bis(trifluoromethanesulfonyl)imide (LiTFSI), Lithium bis(fluorosulfonyl)imide (LiFSI), lithium hexafluoroarsenate (LiAsF$_6$), lithium hexafluorophosphate (LiPF$_6$), lithium tetrafluoroborate (LiBF$_4$), lithium perchlorate (LiClO$_4$), lithium bis(oxalato)borate (LiBOB) and lithium(difluorooxalato) borate (LiDFOB), inclusive of both polarizable and non-polarizable lithium salts; and
    combinations thereof.

6. The method of claim 1, wherein the one or more particulate material(s) is/are selected from aluminum, silver, gold, zinc, magnesium, silicon, tin, germanium, indium, boron, MnO$_2$, Co$_3$O$_4$, SnO$_2$, SiO$_2$, ZnO, Al$_2$O$_3$, Li$_{1.3}$Al$_{0.3}$Ti$_{1.7}$(PO$_4$)$_3$, Li$_{1.5}$Al$_{0.5}$Ge$_{1.5}$(PO$_4$)$_3$, Li$_7$La$_3$Zr$_2$O$_{12}$, Li$_{0.33}$La$_{0.557}$TiO$_3$, Li$_2$O—SiO$_2$—TiO$_2$—P$_2$O$_5$ and lithiophilic carbonaceous materials including nonstructured carbon material(s), graphene, reduced graphene, N-doped graphene, and surface modified graphene;
    and combinations thereof.

7. The method of claim 1, wherein the one or more particulate material(s) is/are selected from one or more of the following: $NaNO_3$, $CsNO_3$, $RbNO_3$, $KNO_3$, $AgNO_3$, $NH_4NO_3$, $Ba(NO_3)_2$, $Sr(NO_3)_2$, $Mg(NO_3)_2$, $Ca(NO_3)_2$, $Ni(NO_3)_2$, $Co(NO_3)_2$, $Mn(NO_3)_2$, $Al(NO_3)_3$, $Ce(NO_3)_3$ and/or $LiNO_3$.

8. The method of claim 7, wherein the one or more particulate material(s) is/are defined as 0.01 M~10 M lithium nitrate ($LiNO_3$) in a solvent.

* * * * *